United States Patent [19]

Ramlow et al.

[11] 4,122,056

[45] Oct. 24, 1978

[54] EMULSION POLYMERIZATION OF ETHYLENICALLY UNSATURATED MONOMERS IN HYDROXY-TERMINATED ORGANIC COMPOUNDS

[75] Inventors: Gerhard Gustav Ramlow, Grosse Ile; Louis Celeste Pizzini, Trenton; John Thomas Patton, Jr., Wyandotte; John Richard Murphy, Trenton; John Eugene Davis, Woodhaven, all of Mich.

[73] Assignee: BASF Wyandotte Corporation, Wyandotte, Mich.

[21] Appl. No.: 880,691

[22] Filed: Feb. 23, 1978

Related U.S. Application Data

[63] Continuation-in-part of Ser. No. 722,043, Sep. 10, 1976, abandoned.

[51] Int. Cl.$^2$ ............... C08F 216/02; C08F 276/06; C08F 2/12
[52] U.S. Cl. ............... 260/29.6 NR; 260/29.6 ME; 260/33.2 R; 260/33.4 PQ; 526/209; 526/333; 521/137
[58] Field of Search ............... 260/2.5 BE, 33.2 R, 260/33.4 PQ, 29.6 NR, 29.6 ME; 526/209, 333

[56] References Cited

U.S. PATENT DOCUMENTS

| | | | |
|---|---|---|---|
| 2,978,421 | 4/1961 | Holloway | 526/333 |
| 3,577,478 | 5/1971 | Thorpe | 260/29.6 NR |
| 3,577,480 | 5/1971 | Thorpe | 260/29.6 NR |
| 3,620,989 | 11/1971 | Cummings | 260/29.6 NR |
| 3,763,277 | 10/1973 | Chu et al. | 260/29.6 NR |
| 3,931,092 | 1/1976 | Ramlow et al. | 260/33.4 R |
| 3,953,393 | 4/1976 | Ramlow et al. | 260/33.2 R |
| 4,010,126 | 3/1977 | Kuzma | 260/29.6 NR |

*Primary Examiner*—Eugene C. Rzucidlo
*Attorney, Agent, or Firm*—Joseph D. Michaels; Bernhard R. Swick; Robert E. Dunn

[57] ABSTRACT

Finely-divided dispersed solids are prepared by the emulsion polymerization in the presence of a free radical catalyst of a major amount of an ethylenically unsaturated monomer or mixture of monomers and a minor amount of a hydroxy-terminated organic compound having from one to eight hydroxyl groups, an oxyethylene content of from about 15 to 80 weight percent, a hydroxyl equivalent weight of from 250 to 10,000 and containing a polymerizable carbon-to-carbon double bond. The resulting polymeric solids are particularly useful in the preparation of reinforced polymer compositions.

18 Claims, No Drawings

EMULSION POLYMERIZATION OF ETHYLENICALLY UNSATURATED MONOMERS IN HYDROXY-TERMINATED ORGANIC COMPOUNDS

CROSS REFERENCE TO RELATED U.S. APPLICATION

The subject application is a continuation-in-part of U.S. patent application Ser. No. 722,043, filed Sept. 10, 1976, now abandoned.

BACKGROUND OF THE INVENTION

1. Field of the Invention

The present invention relates to aqueous dispersions of finely-divided, hydroxy-containing polymeric solids having a particle size of from about 0.03 micron to 10 microns. More particularly, the invention relates to the preparation of finely-divided hydroxy-containing polymeric solids by polymerizing in the presence of a free radical catalyst and water a major amount of an ethylenically unsaturated monomer or mixture of monomers and a minor amount of a hydroxy-terminated organic compound having from one to eight hydroxyl groups, an oxyethylene content of from about 15 to 80 weight percent, a hydroxyl equivalent weight of from 250 to 10,000 and containing a polymerizable carbon-to-carbon double bond.

2. Prior Art

The preparation of finely-divided polymeric solids by polymerizing an ethylenically unsaturated monomer and a hydroxy-terminated organic compound in the presence of a free radical catalyst and various organic solvents is described in U.S. Pat. No. 3,931,092. The use of organic solvents in the process is costly and hazardous. Applicants have found that if certain hydroxy-terminated organic compounds are employed in the process, aqueous emulsion polymerization techniques can be utilized. The present invention relates to a process for the preparation of polymeric solids employing aqueous emulsion polymerization techniques.

SUMMARY OF THE INVENTION

In accordance with the present invention, aqueous dispersions of finely-divided hydroxy-containing polymeric solids are prepared by polymerizing in the presence of a free radical catalyst and water a major amount of an ethylenically unsaturated monomer or mixture of monomers and a minor amount of a hydroxy-terminated organic compound having from one to eight hydroxyl groups, an oxyethylene content of from about 15 to 80 weight percent, a hydroxyl equivalent weight of from 250 to 10,000 and containing a polymerizable carbon-to-carbon double bond. The dispersions are useful in numerous applications such as opacifying agents for liquid detergent formulations, in coating compositions and as flocculants, draining agents and dispersing agents. In addition, the polymeric solids are particularly useful in the preparation of reinforced polymeric compositions to enhance the physical properties thereof.

DESCRIPTION OF THE PREFERRED EMBODIMENTS

In accordance with the present invention, aqueous dispersions of finely-divided hydroxy-containing polymeric solids are prepared by polymerizing a major amount of an ethylenically unsaturated monomer and a minor amount of certain hydroxy-terminated organic compounds in the presence of a free radical catalyst and water. The polymerization may be carried out at a temperature between $-5°$ C. and $130°$ C., preferably between $50°$ C. and $90°$ C. The particular temperature employed will depend primarily on the monomer(s) employed and whether atmospheric or nonatmospheric conditons are selected.

One of the ingredients employed in the present invention is an ethylenically unsaturated monomer or a mixture of said monomers. Representative ethylenically unsaturated monomers which may be employed in the present invention include butadiene, isoprene, 1,4-pentadiene, 1,6-hexadiene, 1,7-octadiene, styrene, $\alpha$-methylstyrene, methylstyrene, 2,4-dimethylstyrene, ethylstyrene, isopropylstyrene, butylstyrene, phenylstyrene, cyclohexylstyrene, benzylstyrene, and the like; substituted styrenes such as chlorostyrene, 2,5-dichlorostyrene, bromostyrene, fluorostyrene, trifluoromethylstyrene, iodostyrene, cyanostyrene, nitrostyrene, N,N-dimethylaminostyrene, acetoxylstyrene, methyl 4-vinylbenzoate, phenoxystyrene, p-vinyl diphenyl sulfide, p-vinylphenyl phenyl oxide, and the like; the acrylic and substituted acrylic monomers such as acrylonitrile, acrylic acid, methacrylic acid, methylacrylate, 2-hydroxyethyl acrylate, 2-hydroxyethyl methacrylate, methyl methacrylate, cyclohexyl methacrylate, benzyl methacrylate, isopropyl methacrylate, octo methacrylate, methacrylonitrile, methyl $\alpha$-chloroacrylate, ethyl $\alpha$-ethoxyacrylate, methyl $\alpha$-acetaminoacrylate, butyl acrylate, ethyl acrylate, 2-ethylhexylacrylate, phenyl acrylate, phenyl methacrylate, $\alpha$-chloroacrylonitrile, N,N-dimethylacrylamide, N,N-dibenzylacrylamide, N-butylacrylamide, methacrylyl formamide, and the like; the vinyl esters, vinyl ethers, vinyl ketones, etc., such as vinyl acetate, vinyl chloroacetate, vinyl alcohol, vinyl butyrate, isopropenyl acetate, vinyl formate, vinyl methoxy acetate, vinyl benzoate, vinyl iodide, vinyl toluene, vinyl naphthalene, vinyl bromide, vinyl fluoride, vinylidene bromide, vinyl chloride, 1-chloro-1-fluoroethylene, vinylidene fluoride, vinylidene chloride, vinyl methyl ether, vinyl ethyl ether, vinyl propyl ethers, vinyl butyl ethers, vinyl 2-ethylhexyl ether, vinyl phenyl ether, vinyl 2-methoxyethyl ether, methoxybutadiene, vinyl 2-butoxyethyl ether, 3,4-dihydro-1,2-pyran, 2-butoxy-2'-vinyloxy diethyl ether, vinyl 2-ethylmercaptoethyl ether, vinyl methyl ketone, vinyl ethyl ketone, vinyl phosphonates such as bis ($\beta$-chloroethyl)vinyl phosphonate, vinyl phenyl ketone, vinyl ethyl sulfide, vinyl ethyl sulfone, N-methyl-N-vinyl acetamide, N-vinyl-pyrrolidone, vinyl imidazole, divinyl sulfide, divinyl sulfoxide, divinyl sulfone, sodium vinyl sulfonate, methyl vinyl sulfonate, N-vinyl pyrrole, and the like; dimethyl fumarate, dimethyl maleate, maleic acid, crotonic acid, fumaric acid, itaconic acid, monomethyl itaconate, t-butylaminoethyl methacrylate, dimethylaminoethyl methacrylate, glycidyl acrylate, allyl alcohol, glycol monoesters of itaconic acid, dichlorobutadiene, vinyl pyridine, and the like. Any of the above monomers that polymerize to water-soluble polymers may only be employed as a co-monomer along with a monomer which yields water-insoluble polymers in the process of the subject invention. Any of the known polymerizable monomers can be used and the compounds listed above are illustrative and not restrictive of the monomers suitable for use in this invention. As mentioned above, the monomer ingredient is employed in major amounts, that is, the monomer ingredient comprises more than 50% by weight of the monomer and hydroxy-terminated organic compound. Generally, the monomer ingredient will be from about 55 to 95%, preferably from about 60 to 80% by weight based on the total weight of monomer and hydroxy-terminated ingredients.

Another inredient employed in the invention is a hydroxy-terminated organic compound containing a polymerizable carbon-to-carbon double bond. The hydroxy-terminated organic compounds of use in the invention have an acid number of one or less, a hydroxyl equivalent weight of from 250 to 10,000, an oxyethylene content of from about 15 to 80 weight percent, and have from one to eight hydroxyl groups. These compounds are well known in the art and are generally prepared by the reaction of an organic compound having from one to eight hydroxyl groups with an organic compound having both ethylenic unsaturation and a hydroxyl, carboxyl, anhydride or epoxy group. They may also be prepared by employing an organic compound having both ethylenic unsaturation and a hydroxyl, carboxyl, anhydride or epoxy group as a reactant in the preparation of the organic compound having from one to eight hydroxyl groups. Furthermore, the hydroxy-terminated organic compounds may be prepared by the reaction of a suitable organic compound having from two to eight hydroxyl groups with a monoester, a halogen-containing compound or an isocyanate-terminated compound, each of which contains a polymerizable carbon-to-carbon double bond, or with a compound, such as acetylene, which upon reaction yields a polymerizable carbon-to-carbon double bond.

Specifically, the hydroxy-terminated organic compounds may be prepared (1) by the reaction of an organic compound having from one to eight hydroxyl groups with a compound such as maleic anhydride; (2) by employing a compound such as allyl glycidylether in the preparation of the organic compound having from one to eight hydroxyl groups; (3) by the transesterification reaction of an organic compound having from two to eight hydroxyl groups with ethyl acrylate, methyl methacrylate, or a similar compound, or by the esterification of the said organic compound with acrylic acid, methacrylic acid, etc.; (4) by the reaction of the sodium or potassium metal salt of an organic compound having from two to eight hydroxyl groups with allyl chloride or vinyl chloride; or (5) by the reaction of the subject organic compounds with acetylene. Additionally, the product of the reaction of toluene diisocyanate with a compound having an active hydrogen and a polymerizable carbon-to-carbon double bond such as 2-hydroxypropyl methacrylate may be reacted with an organic compound having from two to eight hydroxyl groups to yield a hydroxy-terminated organic compound containing a polymerizable carbon-to-carbon double bond. Alternatively, a similar compound may be prepared for treating the prepolymer resulting from the reaction of toluene diisocyanate with an organic compound having from two to eight hydroxyl groups with compounds such as 2-hydroxyethyl acrylate, 4-hydroxybutyl acrylate and the like.

Representative of the organic compounds having both ethylenic unsaturation and a hydroxyl, carboxyl, anhydride or epoxy group which may be used include unsaturated mono- and polycarboxylic acids and anhydrides such as maleic acid and anhydride, fumaric acid, crotonic acid and anhydride, propenyl succinic anhydride, and halogenated maleic acids and anhydrides; unsaturated polyhydric alcohols such as 2-butene-1,4-diol, glycerol allylether, trimethylolpropane allylether, pentaerythritol allylether, pentaerythritol vinylether, pentaerythritol diallylether, and 1-butene-3,4-diol; unsaturated epoxides such as 1-vinylcyclohexane-3,4-epoxide, butadiene monoxide, vinyl glycidylether(1-vinyloxy-2,3-epoxy propane), glycidyl methacrylate and 3-allyloxypropylene oxide (allyl glycidylether). If a polycarboxylic acid or anhydride is employed to incorporate unsaturation into the compounds, it is then preferred to react the resulting compounds with an alkylene oxide, preferably ethylene or propylene oxide, to replace the carboxy groups with hydroxyl groups prior to employment in the present invention. The amount of alkylene oxide employed is such to reduce the acid number of the hydroxy-terminated organic compounds to about one or less. Representative ester-containing compounds containing a polymerizable carbon-to-carbon double bond include methyl acrylate, ethyl acrylate, propyl acrylate, n-butyl acrylate, and the corresponding methacrylates. Representative halogen-containing compounds containing a polymerizable carbon-to-carbon double bond include vinyl chloride, allyl chloride, acrylyl chloride, methacrylyl chloride, vinyl bromide, allyl bromide, acrylyl bromide and methacrylyl bromide.

Representative organic compounds which may be employed in the preparation of the hydroxy-terminated organic compounds employed in the present invention are well known in the art. They are often prepared by the catalytic condensation of an alkylene oxide or mixture of alkylene oxides either simultaneously or sequentially with an organic compound having from one to eight active hydrogen atoms such as evidenced by U.S. Pat. Nos. 1,922,451; 3,190,927, and 3,346,557.

Representative compounds having from one to eight active hydrogen atoms include hydroxy-containing polyesters, hydroxy-containing polyalkylene polyethers, hydroxy-terminated polyurethane polymers, hydroxy-containing phosphorus compounds, and alkylene oxide adducts of mono- and polyhydric thioethers, acetals, aliphatic alcohols, polyols and thiols, ammonia, and primary and secondary amines including aromatic, aliphatic and heterocyclic amines, as well as mixtures thereof. Alkylene oxide adducts of compounds which contain two or more different groups within the above-defined classes may also be used such as amino alcohols which contain an amino group and a hydroxyl group. Also, alkylene oxide adducts of compounds which contain one —SH group and one —OH group as well as those which contain an amino group and a —SH group may be used..

Any suitable hydroxy-containing polyester may be used such as are obtained from polycarboxylic acids and polyhydric alcohols. Any suitable polycarboxylic acid may be used such as oxalic acid, malonic acid, succinic acid, glutaric acid, adipic acid, pimelic acid, suberic acid, azelaic acid, sebacic acid, brassylic acid, thapsic acid, maleic acid, fumaric acid, glutaconic acid, $\alpha$-hydromuconic acid, $\beta$-hydromuconic acid, $\alpha$-butyl-$\alpha$-ethyl-glutaric acid, $\alpha$-$\beta$-diethylsuccinic acid, isophthalic acid, terephthalic acid, hemimeliitic acid, and 1,4-cyclohexane-dicarboxylic acid. Any suitable polyhydric alcohol including both aliphatic and aromatic may be used such as ethylene glycol, 1,3-propylene glycol, 1,2-propylene glycol, 1,4-butylene glycol, 1,3-butylene glycol, 1,2-butylene glycol, 1,5-pentane diol, 1,4-pentane diol, 1,3-pentane diol, 1,6-hexane diol, 1,7-heptane diol, glycerol, 1,1,1-trimethylolpropane, 1,1,1- trimethylolethane, hexane-1,2,6-triol, α-methyl glucoside, pentaerythritol, and sorbitol. Also included with the term "polyhydric alcohol" are compounds derived from phenol such as 2,2-(4,4'-hydroxyphenyl)-propane, commonly known as Bisphenol A.

Any suitable hydroxy-containing polyalkylene polyether may be used such as the polymerization product of an alkylene oxide or of an alkylene oxide with a mono- or polyhydric alcohol having from one to eight hydroxyl groups. Any suitable polyhydric alcohol may be used such as those disclosed above for use in the preparation of the hydroxy-containing polyesters as well as monohydric alcohols such as methanol, ethanol, propanol, butanol and higher aliphatic alcohols containing up to 20 carbon atoms. Any suitable alkylene oxide may be used such as ethylene oxide, propylene oxide, butylene oxide, amylene oxide, and heteric or block copolymers of these oxides. The hydroxy-containing polyalkylene polyethers may be prepared from other starting materials such as tetrahydrofuran and alkylene oxide-tetrahydrofuran copolymers; epihalohydrins such as epichlorohydrin; as well as aralkylene oxides such as styrene oxide. The hydroxy-containing polyalkylene polyethers may have either primary or secondary hydroxyl groups and, preferably, are polyethers prepared from alkylene oxides having from two to six carbon atoms such as polyethylene ether glycols, polypropylene ether glycols, and polybutylene ether glycols. The polyalkylene polyether polyols may be prepared by any known process such as, for example, the process disclosed by Wurtz in 1859 and *Encyclopedia of Chemical Technology*. Vol. 7, pp. 257–262, published by Interscience Publishers, Inc. (1951) or in U.S. Pat. No. 1,922,459. Polyethers which are preferred include the alkylene oxide addition products of trimethylolpropane, glycerine, pentaerythritol, sucrose, sorbitol, propylene glycol, and 2,2-(4,4'-hydroxyphenyl)-propane and blends thereof having equivalent weights of from 500 to 10,000.

Preferred hydroxy-containing polythioethers which may be condensed with alkylene oxides include the condensation product of thiodiglycol or the reaction product of a dihydric alcohol such as is disclosed above for the preparation of the hydroxy-containing polyesters with any other suitable thioether glycol.

The hydroxy-containing polyester may also be a polyester amide such as is obtained by including some amine or amino alcohol in the reactants for the preparation of the polyesters. Thus, polyester amides may be obtained by condensing an amino alcohol such as ethanolamine with the polycarboxylic acid set forth above or they may be made using the same components that make up the hydroxy-containing polyester with only a portion of the components being a diamine such as ethylenediamine.

Polyhydroxy-containing phosphorus compounds which may be used include those compounds disclosed in U.S. Pat. No. 3,639,542. Preferred polyhydroxy-containing phosphorus compounds are prepared from alkylene oxides and acids of phosphorus having a $P_2O_5$ equicalency of from about 72% to about 95%.

Suitable polyacetals which may be condensed with alkylene oxides include the reaction product of formaldehyde or other suitable aldehyde with a dihydric alcohol or an alkylene oxide such as those disclosed above.

Suitable aliphatic thiols which may be condensed with alkylene oxides include alkane thiols such as ethane thiol, propane thiol, pentane thiol, 1,2-ethane dithiol, 1,2-propane dithiol, 1,3-propane dithiol, and 1,6-hexane dithiol; alkene thiols such as 2-butene-1,4-dithiol; and alkyne thiols such as 3-hexane-1,6-dithiol.

Suitable amines which may be condensed with alkylene oxides include aromatic amine such as aniline, o-chloroaniline, p-aminoaniline, 1,5-diamino napthalene, methylene dianiline, the condensation products of aniline and formaldehyde, and 2,4-diamino toluene; aliphatic amines such as methylamine, diethylamine, dipropylamine, triisopropanolamine, ethylene diamine, 1,3-propylenediamine, 1,4-butylenediamine, and 1,3-butylenediamine.

To prepare the hydroxy-terminated organic compounds of use in the present invention, from about 0.3 mole to about 6.0 moles, preferably from 1.0 mole to 2.0 moles, of the unsaturation-containing organic compound per mole of organic compound having from one to eight reactive hydrogen atoms is employed. The preparation of the compounds employed in the present invention follows conventional prior art procedures such as disclosed in U.S. Pat. Nos. 3,275,606 and 3,280,077. Generally, this requires a reaction at a temperature between 0° C. and 150° C. Both acidic catalysts, such as Lewis acid catalysts and basic catalysts such as alkali metal hydroxides, may be used. In addition, a non-catalyzed reaction may be used employing temperatures between 50° C. and 200° C.

The amount of water employed in the polymerization of the subject invention will generally vary from 1 part to 4 parts per part of ethylenically unsaturated monomer(s).

As mentioned above, the polymerization reaction of the invention occurs in the presence of a free radical catalyst, preferably a redox catalyst system. In forming the redox catalyst system, any compounds which will provide the necessary radicals can be used, and such compounds are well known to those who are skilled in the art. Exemplary sources of the sulfate and sulfite radicals are persulfate-bisulfite and bisulfite-peroxide mixtures. It will be appreciated that each radical may be provided separately by suitable water-soluble sulfate or sulfite compounds or that, alternatively, a radical may be formed in situ from a sulfur compound, such as when bisulfite-peroxide mixtures are used.

Any of the water-soluble persalts may be used to furnish the sulfate radical, the ammonium, sodium and potassium persulfates being particularly preferred. The sulfite radical may be provided by sodium bisulfite, sodium formaldehyde sulfoxylate, sulfur dioxide, sodium thiosulfite or an organic oxidizable sulfoxy compound such as diethyl sulfite, etc. These compounds should be used in amounts which will yield the desired radicals in the required amounts.

The quantity of persulfate radical which will be included in the polymerization system should be about 0.5 to 3.0 percent, based upon the weight of polymerizable monomer, and preferably about 0.5 to 1.5 percent. The amount of sulfite radical-bearing component should be chosen so as to yield a percentage of sulfite radical from about 0.5 to 3.0 percent and preferably about 0.5 to 1.5 percent, on the same basis.

For the redox catalyst system to function properly, it is also necessary that a trace amount of activating metal ions be present. This metal may be any which is well known to the art, such as iron, copper, chromium, etc. Often, it is not necessary to add the metal ion as a separate component since sufficient amounts are usually present as trace-impurities in the water which may be used for the polymerization medium. Of course, if for some reason it is desirable to use highly purified or deionized water, it may be found necessary to introduce the activating metal ion separately.

In addition to redox catalyst systems, other free radical catalysts such as peroxides, persulfates and azo compounds, all well known in the art, may be employed.

In addition to the ingredients mentioned above, a chain transfer agent may be employed in the process of the subject invention. Preferred chain transfer agents are the alkyl mercaptans having from one to 20 carbon atoms in the alkyl chain. Illustrative mercaptans include ethyl mercaptan, propyl mercaptan, butyl mercaptan, hexyl mercaptan, octyl mercaptan, decyl mercaptan, dodecyl mercaptan, tetradecyl mercaptan, cetyl mercaptan, and stearyl mercaptan. In addition, any well known emulsifying agents such as sodium alkyl sulfates and polyoxyethylene polyoxypropylene block copolymers may be employed in the invention.

The finely-divided solids prepared in accordance with the present invention may be separated from the liquid phase by any conventional method including centrifugation, precipitation, solvent evaporation, etc. The preparation of the polymeric solids of the subject invention may be carried out in several ways. Since the polymerization is generally carried out at temperatures below 100° C., a preferred embodiment of the invention is to charge all components to a reactor and apply heat thereto. Optionally, the reaction may be carried out by adding the monomer or a blend of the monomer and catalyst to the other reactants. Also, a portion of the catalyst, chain transferring agent and monomer may be dispersed in a portion of the hydroxy-terminated unsaturation-containing organic compound and added to a reaction vessel containing the remaining portion of the reactants, catalyst, water and chain transferring agent. In addition, the catalyst, chain transferring agent and monomer may be combined optionally with a portion of the hydroxy-terminated unsaturation-containing organic compound in a mixing device and thereafter added to a reaction vessel containing the remaining reactants.

The following examples illustrate the nature of the invention. All parts are by weight unless otherwise indicated

EXAMPLES 1-9

A series of aqueous dispersions was prepared by polymerizing in water a major amount of an ethylenically unsaturated monomer or mixture of monomers and a hydroxy-terminated organic compound containing a polymerizable carbon-to-carbon double bond. In each case, a reaction vessel equipped with a stirrer, thermometer, reflux condenser, inlet and outlet means, nitrogen source and heat exchange means was charged with water, part of the catalyst system, monomer(s) and unsaturation-containing organic compound. Thereafter, the temperature of the charge was adjusted to the desired reaction temperature and the remaining part of the catalyst system (reducing agent) was gradually added to the charge. The reaction mixture was stirred for about 2 to 5 hours. In the examples which follow, the catalyst system employed as 1.0 part of ammonium persulfate, 0.1 part of ferrous sulfate and 1.6 parts of sodium bisulfite. Dispersions containing finely-divided particles generally varying in size between 0.01 micron to 5 microns were obtained. The hydroxy-terminated, unsaturation-containing organic compound employed, hereinafter referred to as HTOC:I, was prepared in the following manner.

Preparation of HTOC:I

A stainless steel autoclave equipped with a thermometer, stirrer, nitrogen source, inlet means and heat exchange means was charged with 406.5 parts of a 408 molecular weight polyol prepared by the reaction of propylene oxide with 1,4-butenediol. The charge was purged with nitrogen and heated to 105° C. Then, 3169 parts of propylene oxide was gradually added to the reaction mixture over 8 hours. Upon completion of the oxide addition, the reaction mixture was maintained at 105° C. for 7 hours, at which time the reaction mixture was evacuated to 60 mm. of mercury and held at 105° C. for 30 minutes. Thereafter, the mixture was purged with nitrogen and 1539 parts of ethylene oxide was gradually added to the reaction mixture at 105° C. over a period of 4 hours. Upon completion of the oxide addition, the reaction mixture was maintained at 105° C. for 2 hours, cooled to 30° C. and discharged from the autoclave. The reaction product was stripped at 100° C. for 1 hour under less than 10 millimeters of mercury to remove unreacted oxide. The product, a clear liquid, had a hydroxyl number of 29.8, an acid number of 0.01, an oxyethylene content of 30 weight percent, and a Brookfield viscosity at 25° C. of 1620 cps.

Details of the preparations of the emulsions as well as physical characteristics of the resulting products are presented in Table 1, below. All of the products of the subject invention are useful in the preparation of polyurethane foams having improved physical properties, particularly tear and tensile strength and load-bearing.

TABLE 1

| Example* | HTOC-I, parts | Vinyl Monomer, Parts | | Reaction Temperature, ° C. | Product Appearance |
|---|---|---|---|---|---|
| | | AN | St | | |
| 1 | 15 | 90 | — | −5 | White dispersion |
| 2 | 15 | 90 | — | 20 | White dispersion |
| 3 | 15 | 60 | 30 | 80 | White dispersion |
| 4 | 15 | 90 | — | 80 | White dispersion |
| 5 | 15 | 45 | 45 | 80 | White dispersion |
| 6 | 30 | 45 | 45 | 80 | White dispersion |
| 7 | 45 | 45 | 45 | 85 | White dispersion |
| 8** | 30 | 45 | 45 | 80 | White dispersion |
| 9** | 45 | 45 | 45 | 85 | White dispersion |

AN = Acrylonitrile
St = Styrene
* = All Examples employ 300 parts of water.
** = 1 Part of cumene hydroperoxide was substituted for the ammonium persulfate.

EXAMPLE 10

(A) Preparation of HTOC-II

A stainless steel autoclave equipped with a thermometer, stirrer, nitrogen source, inlet means and heat exchange means was charged with 17.6 parts of propylene glycol and 530 parts of a 325 molecular weight polyol prepared by the condensation in the presence of potassium hydroxide of four moles of propylene oxide with 1 mole of glycerol. The charge was purged with nitrogen and heated to 105° C. With constant stirring, a mixture of 4783.6 parts of propylene oxide and 68.4 parts (corresponding to 0.3 mole per mole of product) of allyl-glycidylether was gradually added to the reaction mixture over ten hours. Upon completion of the oxide addition, the reaction mixture was maintained at 105° C. for 4 hours. Thereafter, 975 parts of ethylene oxide was added over a period of 2 hours. Upon completion of the ethylene oxide addition, the mixture was maintained at 105° C. for 1 hour. The reaction mixture was cooled to 30° C. and discharged from the autoclave. The reaction product was treated with an adsorbent, filtered to remove the catalyst and stripped at 100° C. for 1 hour under less than 5 millimeters of mercury to remove volatiles. The product, hereinafter referred to as HTOC-II, was a clear colorless liquid having a hydroxyl number of 59.3, an acid number of 0.01, an oxyethylene content of 15% by weight, and a Brookfield viscosity at 25° C. of 480 cps.

(B) Preparation of Aqueous Emulsion

Following the procedure described in Example 1, 30 parts of HTOC-II, 300 parts of water, 90 parts of acrylonitrile and one part of ammonium persulfate was charged to a reaction vessel and the charge was heated to 40° C. While maintaining the temperature of the charge at 80° C., 0.1 part of ferrous sulfate and 1.6 parts of sodium bisulfite was continuously added to the charge over a period of 1 hour. The reaction mixture was then maintained at 40° C. for an additional hour. The resulting product was an opaque white dispersion which, upon separation of the water, yields a finely-divided white powder.

EXAMPLE 11

(A) Preparation of HTOC-III

A reaction vessel equipped as described in the previous Example was charged with 2637 parts of an 8350 molecular weight polyoxyethylene polyoxypropylene block copolymer prepared by the reaction of ethylene oxide with the propylene oxide adduct of propylene glycol (oxyethylene content of 80% by weight) and 29.4 parts of maleic anhydride. The charge was purged with nitrogen and heated to 175° C. and pressurized with nitrogen to 34 psig. With constant stirring, 79 parts of ethylene oxide was gradually added to the charge over a 2-hour period. Upon completion of the oxide addition, the reaction mixture was maintained at 175° C. for 11 hours. The reaction mixture was cooled to 30° C. and discharged from the reactor. The product, hereinafter referred to as HTOC-III, was a clear liquid having a hydroxyl number of 25 and an acid number of 0.01.

(B) Preparation of Aqueous Emulsion

A finely-divided dispersed solid was prepared in the manner described in the previous Example employing the following ingredients and amounts thereof:

| Ingredients | Parts, Weight |
|---|---|
| HTOC-III | 10 |
| Water | 90 |
| Styrene | 100 |
| $K_2S_2O_8$ | 0.5 |

The reaction was carried out at 80° C. for 5 hours. A white stable dispersion resulted which, upon separation of the water, yields a finely-divided white powder. The powder was suspended in water to give a 5 percent by weight solids suspension and was employed as an opacifier for a light duty liquid dishwashing detergent composition. The resulting composition retained its opacifying property after three week storage at room temperature.

EXAMPLE 12

(A) Preparation of HTOC-IV

A reactor equipped as described in Example 1 was charged with 260 parts of the 4-mole propylene oxide adduct of glycerine, purged with nitrogen and heated to 105° C. Thereafter, 99.5 parts of 4-vinylcyclohexene oxide was added to the charge followed by the addition of 279 parts of propylene oxide over a period of 1 hour. Upon completion of the oxide addition, the reaction mixture was heated at 105° C. for 10 hours. The mixture was evacuated to 60 mm. of mercury and maintained at 105° C. for 30 minutes to remove unreacted volatiles. Thereafter the reactor was sealed and 3861 parts of propylene oxide was added to the reaction mixture and held at 105° C. for 6 hours. Upon completion of the oxide addition, the reaction mixture was maintained at 105° C. for 6 hours, evacuated to 60 mm. of mercury and held at 105° C. for 30 minutes to remove volatiles. Thereafter, the rector was sealed and pressured to 34 psig. under nitrogen and 1500 parts of ethylene oxide was added to the reactor in 3 hours at 105° C. Upon completion of the ethylene oxide addition, the reaction mixture was maintained at 105° C. for 2 hours, cooled to 30° C. and discharged from the reactor. The reaction product was treated with an adsorbent, filtered and stripped at 105° C. for 1 hour and less than 10 millimeters of mercury. The product, hereinafter referred to as HTOC-IV, was a clear liquid having an oxyethylene content of 25% by weight, a hydroxyl number of 31.6, and an acid number of 0.006.

(B) Preparation of Aqueous Emulsion

| Ingredients | Amounts, Parts |
|---|---|
| HTOC-IV | 60 |
| Water | 697 |
| Acrylonitrile | 90 |
| Styrene | 90 |
| Cumene Hydroperoxide | 2.0 |
| Ferrous Sulfate | 0.17 |
| Sodium Bisulfite | 2.9 |

The reaction temperature was 70° C. and the time of reaction was 100 minutes. The resulting product was a white dispersion which, upon separation of the water, yields a finely-divided white powder.

EXAMPLE 13

A series of polymerizations were carried out to illustrate the subject invention. Three polymerizations were carried out in water and three in isopropanol. In all cases a 70/30 weight mixture of acrylonitrile and styrene was employed. The aqueous polymerizations were catalyzed by an ammonium persulfate/sodium bisulfite/ferrous sulfate redox system whereas the isopropanol systems used azobis(isobutyronitrile). All reactions were carried out for 4 hours at 80° C. The difference in each reaction resided in the hydroxy-terminated organic compound employed. The compounds employed were as follows.

HTOC-V—Polyol prepared by reaction of butenediol with propylene oxide, said polyol having a hydroxyl number of 32.7 and an acid number of 0.01.

HTOC-VI—Polyol prepared by reaction of butenediol first with propylene oxide and thereafter with ethylene oxide, said polyol having a hydroxyl number of 30.7, an oxyethylene content of 30% by weight and an acid number of 0.01.

HTOC-VII—Polyol prepared by reaction of butenediol first with propylene oxide and thereafter with ethylene oxide, said polyol having a hydroxyl number of 28.4, an oxyethylene content of 50% by weight and an acid number of 0.01.

In all three polymerizations in isopropanol, white dispersions of finely-divided polymer particles were obtained. Separation of the polymer resulted in finely divided waxy solids which fused to a continuous solid when heated.

The polymerization using HTOC-V in an aqueous medium did not provide a dispersion but rather large spheres of polymers in a translucent liquid medium. The aqueous polymerizations in HTOC-VI and VII resulted in white dispersions of finely-divided polymer particles. Separation of the polymer resulted in fine, dry powders.

The embodiments of the invention in which an exclusive property or privilege is claimed are defined as follows:

1. An aqueous emulsion of finely-divided hydroxy-containing polymeric solids prepared by polymerizing, at a temperature between −5° C. and 130° C. in the presence of a catalytically sufficient amount of a free radical catalyst and water in an amount of from about one part to four parts per part of (a) below,
   (a) a major amount of an ethylenically unsaturated monomer or mixture of monomers and
   (b) a minor amount of a hydroxy-terminated organic compound having an acid number of one or less, from one to eight hydroxyl groups, an oxyethylene content of from about 15 to 80 weight percent, a hydroxyl equivalent weight of from 250 to 10,000 and containing a polymerizable carbon-to-carbon double bond.

2. The emulsion of claim 1 wherein the ethylenically unsaturated monomer is selected from the group consisting of styrene, acrylonitrile, vinylidene chloride, methylmethacrylate, acrylamide and mixtures thereof.

3. The emulsion of claim 1 wherein the ethylenically unsaturated monomer is a mixture of styrene and acrylonitrile.

4. The emulsion of claim 1 wherein the ethylenically unsaturated monomer is styrene.

5. The emulsion of claim 1 wherein the hydroxy-terminated organic compound is prepared by the reaction of from 1 to 2 moles of an organic compound having both ethylenic unsaturation and a hydroxyl, carboxyl or epoxy group with 1 mole of a hydroxy-containing polyalkylene polyether followed by reaction with an alkylene oxide to yield a compound having an acid number of less than one.

6. The emulsion of claim 5 wherein the organic compound having both ethylenic unsaturation and a hydroxyl, carboxyl or epoxy group is maleic anhydride.

7. The emulsion of claim 5 wherein the hydroxy-containing polyalkylene ether is an alkylene oxide adduct of trimethylolpropane, glycerol, propylene glycol and mixtures thereof.

8. The emulsion of claim 1 wherein the ethylenically unsaturated monomer comprises from 60 to 80 weight percent based on the total weight of monomer and hydroxy-terminated organic compound.

9. A process for the preparation of an aqueous emulsion of a finely-divided hydroxy-containing polymeric solid comprising polymerizing, at a temperature between −5° C. and 130° C. in the presence of a catalytically sufficient amount of a free radical catalyst and water in an amount of from about one part to four parts per part of (a) below,
   (a) a major amount of an ethylenically unsaturated monomer or mixture of monomers and
   (b) a minor amount of a hydroxy-terminated organic compound having an acid number of one or less, from one to eight hydroxy groups, an oxyethylene content of from about 15 to 80 weight percent, a hydroxyl equivalent weight of from 250 to 10,000, and containing a polymerizable carbon-to-carbon double bond.

10. The process of claim 9 wherein the ethylenically unsaturated monomer is selected from the group consisting of styrene, acrylonitrile, vinylidene chloride, methylmethacrylate, acrylamide and mixtures thereof.

11. The process of claim 9 wherein the ethylenically unsaturated monomer is a mixture of styrene and acrylonitrile.

12. The process of claim 9 wherein the ethylenically unsaturated monomer is styrene.

13. The process of claim 9 wherein the hydroxy-terminated organic compound is prepared by the reaction of from 1 to 2 moles of an organic compound having both ethylenic unsaturation and a hydroxyl, carboxyl or epoxy group with 1 mole of a hydroxy-containing polyalkylene polyether followed by reaction with an alkylene oxide to yield a compound having an acid number of less than one.

14. The process of claim 13 wherein the organic compound having both ethylenic unsaturation and a hydroxyl, carboxyl or epoxy group is maleic anhydride.

15. The process of claim 13 wherein the hydroxy-containing polyalkylene ether is an alkylene oxide adduct of trimethylolpropane, glycerol, propylene glycol and mixtures thereof.

16. The process of claim 13 wherein the ethylenically unsaturated monomer comprises from 60 to 80 weight percent based on the total weight of monomer and hydroxy-terminated organic compound.

17. The process of claim 9 wherein the free-radical catalyst is a redox catalyst system.

18. The process of claim 17 wherein the catalyst system was a mixture of persulfate and bisulfite radicals.

* * * * *